United States Patent [19]

Stephenson et al.

[11] Patent Number: 5,065,793
[45] Date of Patent: Nov. 19, 1991

[54] FLUID CONTROLLER WITH LOAD SENSING PRIORITY FLOW CONTROL CAPABILITY

[75] Inventors: Dwight B. Stephenson, Savage; Dennis R. Marks, Eden Prairie, both of Minn.

[73] Assignee: Eaton Corporation, Cleveland, Ohio

[21] Appl. No.: 666,168

[22] Filed: Mar. 7, 1991

Related U.S. Application Data

[63] Continuation-in-part of Ser. No. 513,366, Apr. 23, 1990, Pat. No. 5,016,672.

[51] Int. Cl.⁵ .......................................... F15B 13/06
[52] U.S. Cl. .............................. 137/625.24; 60/384; 91/467; 91/516; 137/596.13
[58] Field of Search .................... 60/384; 91/467, 516; 137/596.13, 625.24

[56] References Cited

U.S. PATENT DOCUMENTS

| | | | |
|---|---|---|---|
| 3,455,210 | 7/1969 | Allen | 91/446 |
| 3,481,147 | 12/1969 | Goff | |
| 3,996,742 | 12/1976 | Goff | 60/422 |
| 3,996,838 | 12/1976 | Goff | 91/32 |
| 4,043,419 | 8/1977 | Larson et al. | 180/132 |

Primary Examiner—Gerald A. Michalsky
Attorney, Agent, or Firm—L. J. Kasper

[57] ABSTRACT

A fluid controller (15) is provided of the type which controls the flow of fluid from a source (11) to a priority device (19) and an auxiliary device (21). The controller includes a valving arrangement (33) comprising a primary, rotatable spool valve (51), and a cooperating, relatively rotatable follow-up sleeve valve member (53). The spool and sleeve cooperate to define controller valving (35) while the sleeve and housing cooperate to define load sensing, priority flow control valving (37). In a preferred embodiment, the controller valving is defined by relative rotation between the spool and the sleeve, while the priority flow control valving is defined by relative axial movement between the sleeve and the housing. The axial position of the sleeve is controlled by fluid pressure in a pilot pressure chamber (95), and in a load signal chamber (103), the difference therebetween representing the pressure differential across a main variable flow control orifice (A1) defined by the controller valving (35). With the present invention, load sensing, priority flow control valving is provided without the need for separate valving, external to the controller, and without the need for the associated plumbing.

34 Claims, 12 Drawing Sheets

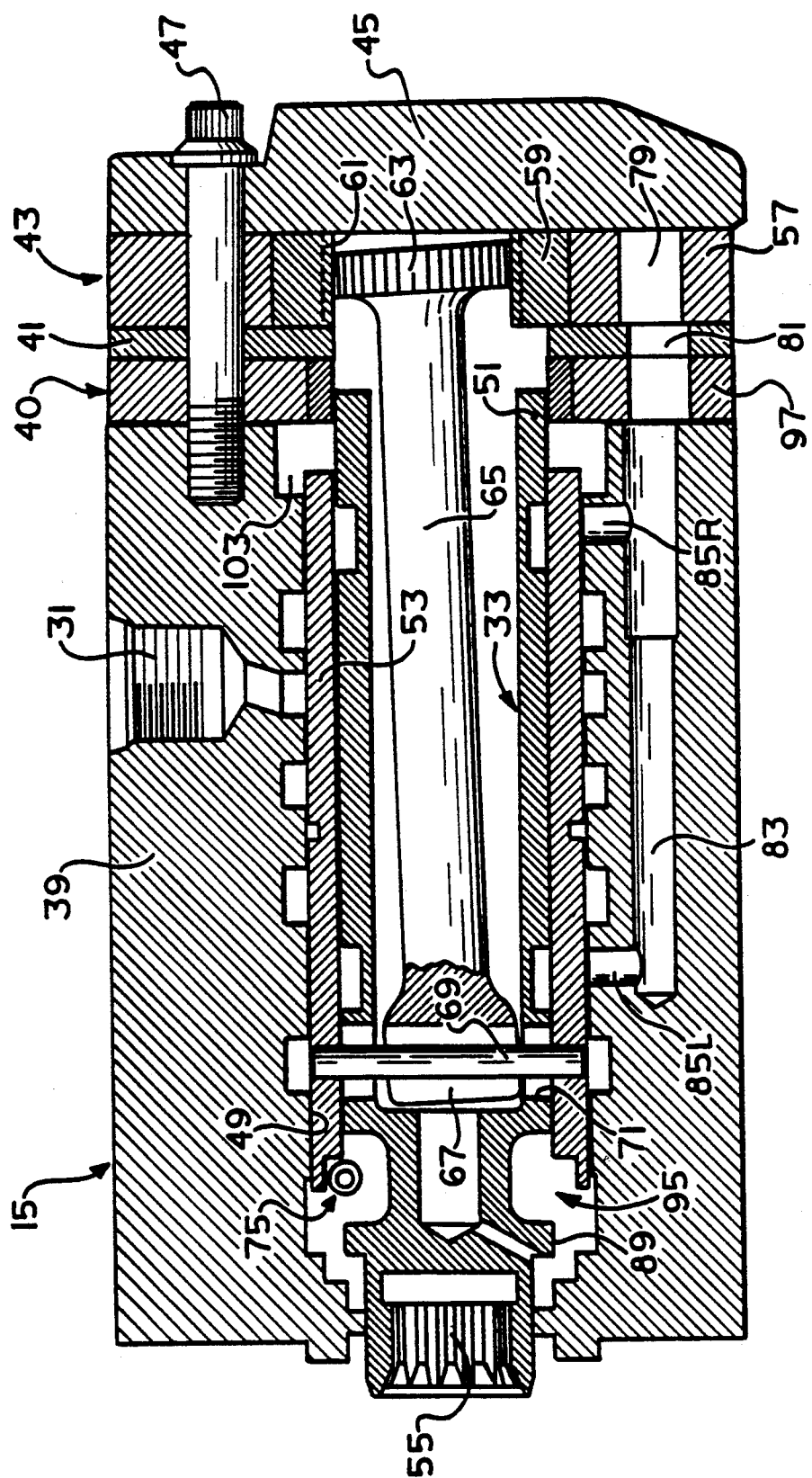

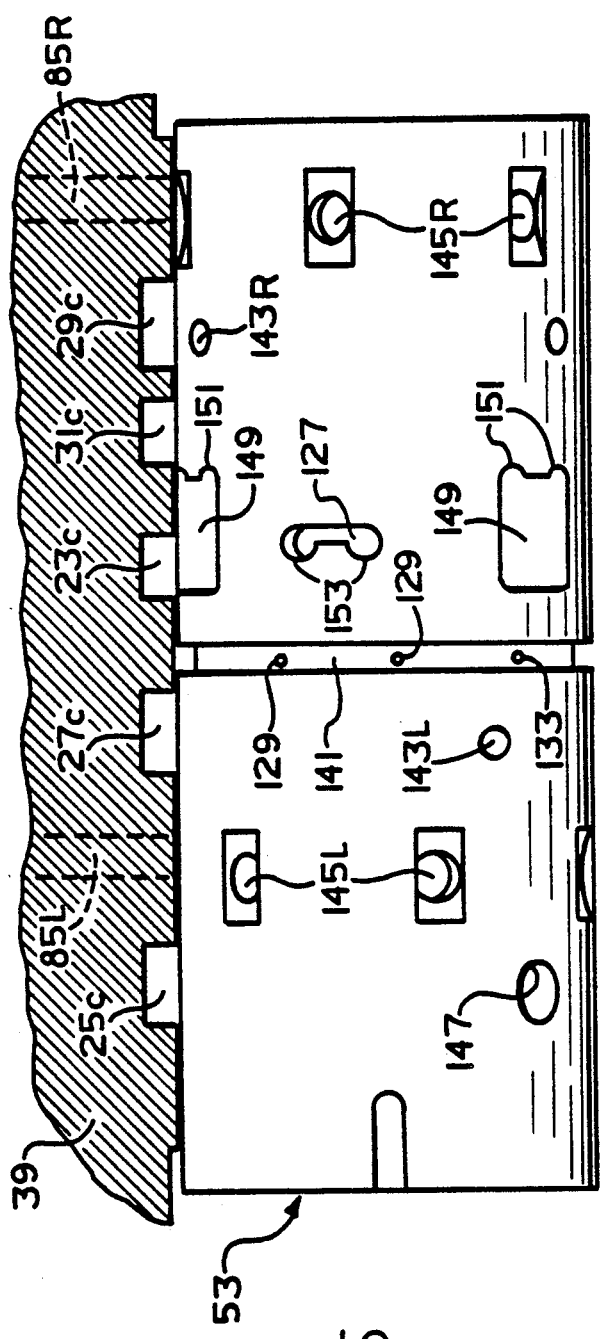
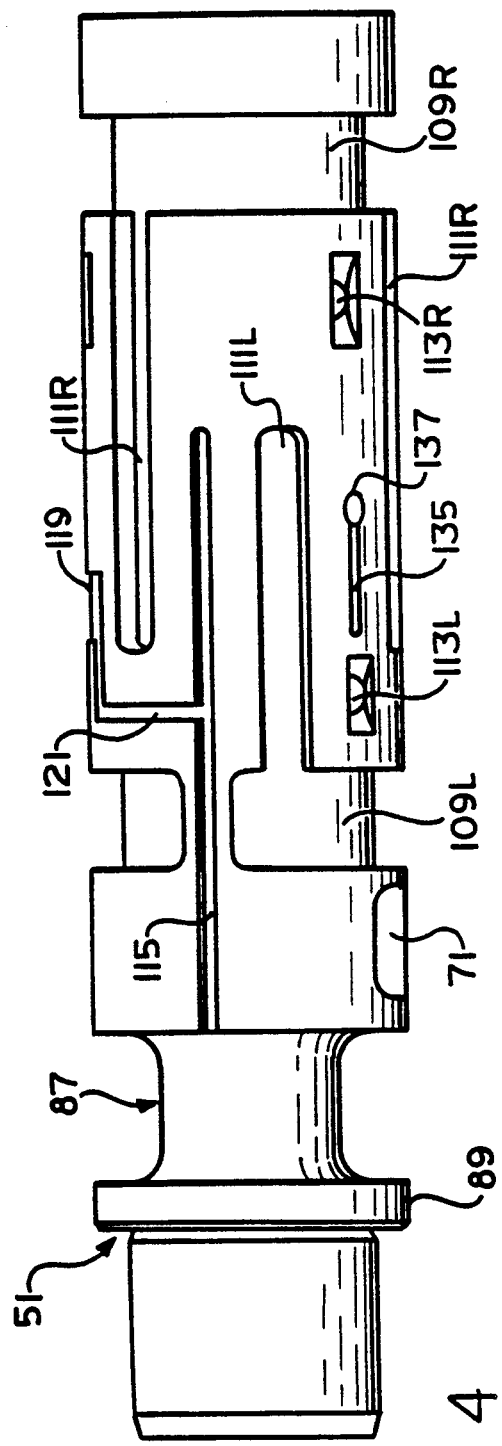
FIG. 5
FIG. 4

FLUID CONTROLLER WITH LOAD SENSING PRIORITY FLOW CONTROL CAPABILITY

CROSS-REFERENCE TO RELATED APPLICATION

This Application is a continuation-in-part of co-pending application U.S. Ser. No. 513,366, filed Apr. 23, 1990, now U.S. Pat. No. 5,016,672, in the name of Dwight B. Stephenson for a "STEERING VALVE WITH INTEGRAL PARALLEL CONTROL".

BACKGROUND OF THE DISCLOSURE

The present invention relates to a system for providing pressurized fluid to a plurality of load circuits (fluid pressure operated devices), and more particularly, to such a system in which one of the load circuits is given priority, with all flow not being used by the priority load circuit going to the other (auxiliary) load circuit.

The present invention is equally adapted to any arrangement in which pressurized fluid is communicated to a priority load circuit, and an auxiliary load circuit, by a load sensing priority flow control valve, in response to a load pressure signal indicating the demand for fluid by the priority load circuit. However, the invention is especially advantageous in arrangements in which the priority load circuit comprises a vehicle hydrostatic power steering system, and the invention will be described in connection therewith.

Load sensing priority flow control systems have become increasingly popular for use in many applications to provide pressurized fluid to multiple load circuits from a single source, partly to make the overall system less expensive, and partly to minimize the energy consumption (i.e., the load on the vehicle engine). The earliest known load sensing priority flow control system is illustrated and described in U.S. Pat. No. 3,455,210, assigned to the assignee of the present invention, and incorporated herein by reference. A later teaching of such a system is contained in U.S. Pat. No. 4,043,419, also assigned to the assignee of the present invention, and incorporated herein by reference. In this latter patent, there is a specific teaching of the priority load circuit comprising a hydrostatic power steering device. Furthermore, there is a specific teaching of any particular load sensing priority flow control valve and hydrostatic power steering unit combination being used with any one of the following:

(1) a fixed displacement pump and an open center auxiliary device; or,
(2) a pressure compensated pump and closed center auxiliary device; or,
(3) a load sensing pump and a load sensing auxiliary device.

The ability of load sensing priority flow control systems to provide improved performance with substantially reduced engine horsepower consumption is so substantial that, for a number of years, the manufacturers of most agricultural and construction type vehicles have been converting from the traditional open center and closed center systems to load sensing systems. However, the conversion to load sensing systems has not been made universally, primarily because of the cost associated with the load sensing priority valve itself, and the associated plumbing between the priority valve and the priority load circuit, and between the priority valve and the auxiliary load circuit. It has long been assumed, however, that the extra costs required to provide a load sensing system are basically unavoidable.

SUMMARY OF THE INVENTION

Accordingly, it is an object of the present invention to provide an improved load sensing priority flow control system in which the need for a separate load sensing priority flow control valve, and some of its associated plumbing, is substantially eliminated.

It is a more specific object of the present invention to provide such an improved priority flow control system, in which the priority load circuit comprises a hydrostatic power steering unit (fluid controller), and the load sensing priority flow control valve is integral with the power steering unit.

It is an even more specific object of the present invention to provide an improved load sensing priority flow control system which accomplishes the above-stated objects, and in which the function of the load sensing priority flow control valve is accomplished within and by the valving in the hydrostatic power steering unit.

The above and other objects of the present invention are accomplished by the provision of an improved system including a source of pressurized fluid, a priority fluid pressure operated device, an auxiliary fluid pressure operated device, a controller means operable to control the flow of fluid to the priority fluid pressure operated device, and load sensing priority flow control valve means operable to control the flow of fluid from the source of fluid to the controller means, and to the auxiliary device. The controller means includes housing means defining first and second control fluid ports for connection to the priority fluid pressure operated device, and valve means disposed in the housing means, and comprising a generally cylindrical spool valve member and a hollow, generally cylindrical sleeve valve member disposed radially between the housing means and the spool valve member. The spool and sleeve valve members define a neutral position relative to each other and a first operating position relative to each other, and the housing means and the sleeve valve member define a first position relative to each other. The controller means further defines a controller inlet, a first variable flow control orifice in fluid communication with the fluid inlet, and a second variable flow control orifice in fluid communication with the first control fluid port. The first and second variable flow control orifices are defined at the interface of the spool and sleeve valve members, when the valve members are in the first operating position. The housing means and the valve members cooperate to define a main fluid path providing fluid communication between the first and second variable flow control orifices when the valve members are in the first operating position. The load sensing priority flow control valve means includes means defining a priority flow control orifice operable to control the flow of fluid from the source to the controller means, and an auxiliary flow control orifice operable to control the flow of fluid from the source to the auxiliary device, in response to the demand for fluid by the priority device.

The improved system is characterized by the sleeve valve member and the housing means defining a second position relative to each other. The controller means includes means operable to bias the sleeve valve member toward the first position relative to the housing means, and means operable to bias the sleeve valve member toward the second position, relative to the housing means. The sleeve valve member and the housing means cooperate to define the priority flow control orifice when the sleeve valve member is in the first position relative to the housing means, and the sleeve valve member and the housing means cooperate to define the auxiliary flow control orifice, when the sleeve valve member is in the second position relative to the housing means.

BRIEF DESCRIPTION OF THE DRAWINGS

FIG. 2 is an axial cross-section of a fluid controller made in accordance with the present invention, and with the schematic of FIG. 1.

FIG. 4 is an elevation view of the primary valve member shown in the overlay view of FIG. 3, and on substantially the same scale as in FIG. 3.

FIG. 5 is an elevation view of the follow-up valve member shown in the overlay view of FIG. 3, and on substantially the same scale as in FIG. 3.

DESCRIPTION OF THE PREFERRED EMBODIMENT

Figure 1:
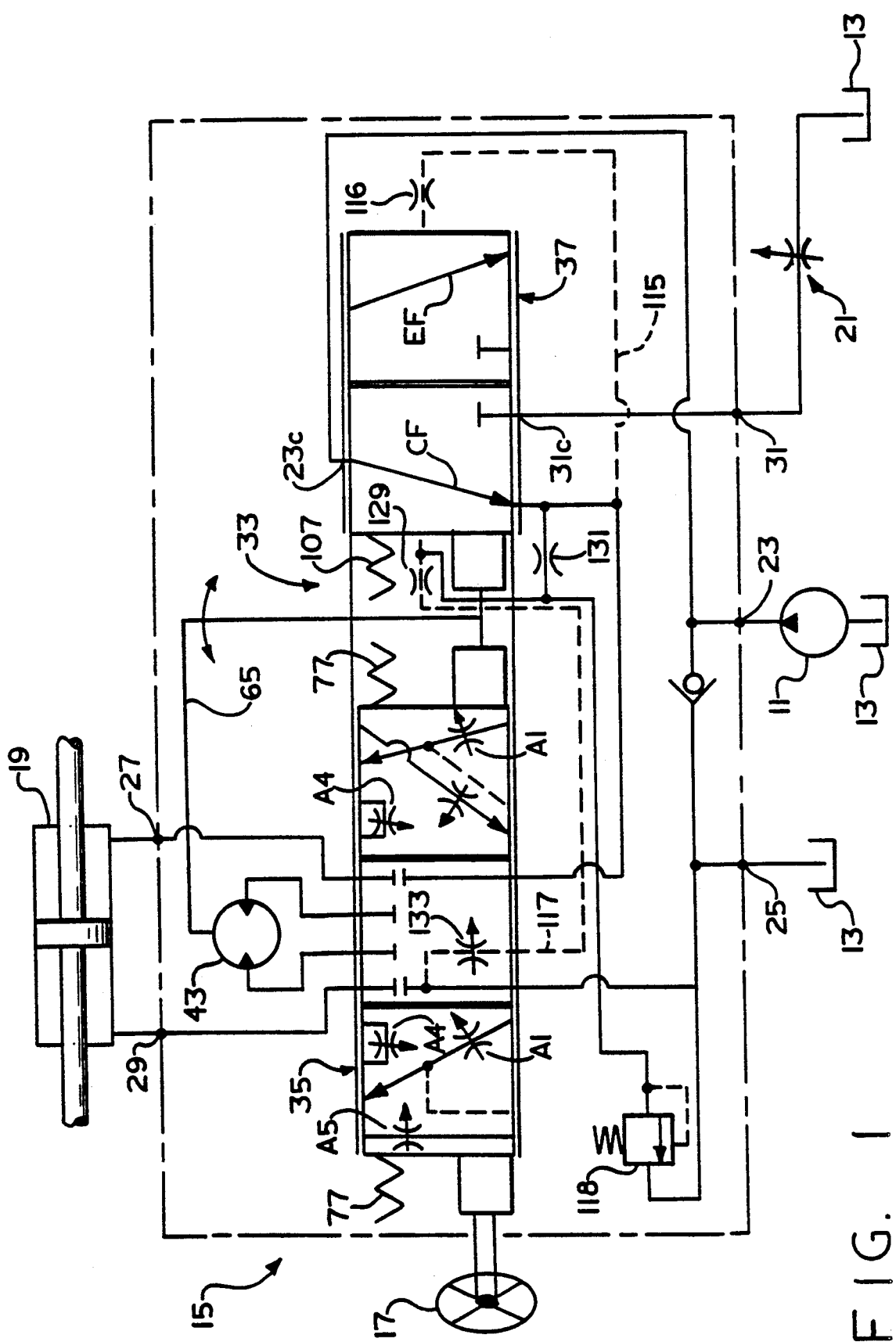
FIG. 1 is a hydraulic schematic of a load sensing priority flow control system, made in accordance with the present invention.

Referring now to the drawings, which are not intended to limit the invention, FIG. 1 is a hydraulic schematic of a load sensing priority flow control system made in accordance with the present invention. More specifically, the schematic of FIG. 1 illustrates a vehicle hydrostatic power steering system, including a fluid controller made in accordance with the present invention. The system includes a fluid pump 11, shown herein as a fixed displacement pump, having its inlet connected to a system reservoir 13. The system includes a fluid controller, generally designated 15, which receives rotary input by means of a steering wheel 17, and apportions the flow of fluid from the pump 11 between (1) a priority load circuit comprising a fluid pressure operated vehicle steering cylinder 19; and (2) an open-center auxiliary load circuit, represented schematically as a variable orifice designated 21.

Referring still to FIG. 1, the fluid controller 15 includes an inlet port 23, a return port 25, and a pair of control (cylinder) fluid ports 27 and 29, which are connected to opposite ends of the steering cylinder 19. The fluid controller 15 further includes an excess flow port 31, which is connected to the auxiliary load circuit 21.

In accordance with a primary feature of the present invention, the fluid controller 15 includes valving, generally designated 33, which performs two distinct functions; (1) controller valving, generally designated 35; and (2) load sensing, priority flow control valving, generally designated 37. The function of the controller valving 35, as is well known in the art, is to control the flow of fluid from a controller inlet (or the outlet of the priority valving 37) to the steering cylinder 19, in response to rotation of the steering wheel 17. The function of the load sensing, priority flow control valving 37 is to control the flow of fluid from the inlet port 23 to either the controller valving 35 or to the excess flow outlet port 31, in response to load pressure signals (to be described in greater detail subsequently) which are representative of the demand for fluid by the controller valving 35 and steering cylinder 19.

It should be noted in reviewing FIG. 1, that some license has been taken therein in showing the valving 33 because the controller valving 35 and the load sensing, priority flow control valving 37 are shown as schematically separate, but in accordance with one aspect of the present invention, both the valving 35 and the valving 37 are accomplished by the same valving elements, as will also be described in greater detail subsequently.

Referring now to FIG. 2, in conjunction with FIG. 1, the fluid controller 15 will be described in greater detail, structurally, but with reference to the schematic of FIG. 1, where appropriate. The fluid controller 15 may be of the general type illustrated and described in U.S. Pat. No. 25,126, assigned to the assignee of the present invention, and incorporated herein by reference. The subject embodiment is more specifically of the type illustrated and described in the cross-referenced copending application U.S. Ser. No. 513,366, now U.S. Pat. No. 5,016,672.

The fluid controller 15 comprises several sections, including a valve housing section 39, a spacer section 40, a wear plate 41, a section comprising a fluid meter 43 (also shown schematically in FIG. 1), and an end cap 45. These sections are held together in tight sealing engagement by means of a plurality of bolts 47, which are in threaded engagement with the valve housing 39. The valve housing 39 defines the fluid inlet port 23, the return port 25, the control fluid ports 27 and 29, and the excess flow port 31, with only the port 31 being shown in FIG. 2.

The valve housing 39 also defines a valve bore 49, and rotatably disposed therein is the valving arrangement 33, which, in the subject embodiment, comprises a primary, rotatable valve member 51 (also referred to hereinafter as the "spool"), and a cooperating, relatively rotatable follow-up valve member 53 (also referred to hereinafter as the "sleeve"). At the forward end of the spool 51 is a portion having a reduced diameter, and defining a set of internal splines 55 which provide for a direct mechanical connection between the spool 51 and the steering wheel 17. The spool 51 and sleeve 53 will be described in greater detail subsequently.

The fluid meter 43 may be of the type well known in the art, and in the subject embodiment, includes an internally-toothed ring member 57, and an externally-toothed star member 59, which is eccentrically disposed within the ring 57, for orbital and rotational and movement relative thereto. The star 59 defines a set of internal splines 61, and in splined engagement therewith is a set of external splines 63 formed at the rearward end of a drive shaft 65. The drive shaft 65 has a bifurcated forward end 67 permitting driving connection between the shaft 65 and the sleeve 53, by means of a drive pin 69. The ends of the pin 69 pass through a pair of oversized pin openings 71 defined by the spool 51, and are received in relatively close fitting openings 73 in the sleeve 53.

As is well known to those skilled in the art, pressurized fluid flows through the various passages and ports defined by the spool 51 and sleeve 53, then flows through the fluid meter 43, causing orbital and rotational movement of the star 59 within the ring 57. Such movement of the star 59 causes rotational follow-up movement of the sleeve 53, by means of the drive shaft 65 and drive pin 69, to maintain a particular relative displacement (referred to hereinafter as a "rotary operating position") between the spool 51 and the sleeve 53. The particular rotary operating position, i.e., the amount of rotational displacement between the spool and sleeve is generally proportional to the rate of rotation of the steering wheel 17.

Referring still to FIG. 2, disposed adjacent the forward end (left end in FIG. 2) of the spool 51 and sleeve 53 is a neutral centering spring arrangement, generally designated 75, of the type which is illustrated and described in greater detail in co-pending application U.S. Ser. No. 602,829, filed Oct. 24, 1990, in the name of Dwight B. Stephenson for a "LARGE DEFLECTION ANGLE ROTARY MODULATION STEERING VALVE", assigned to the assignee of the present invention and incorporated herein by reference. Typically, the arrangement 75 would include at least one helical, coiled compression spring 77, biasing the sleeve 53 toward a "rotary neutral" position (as that term will be defined in connection with FIG. 3) relative to the spool 51.

Figure 6:
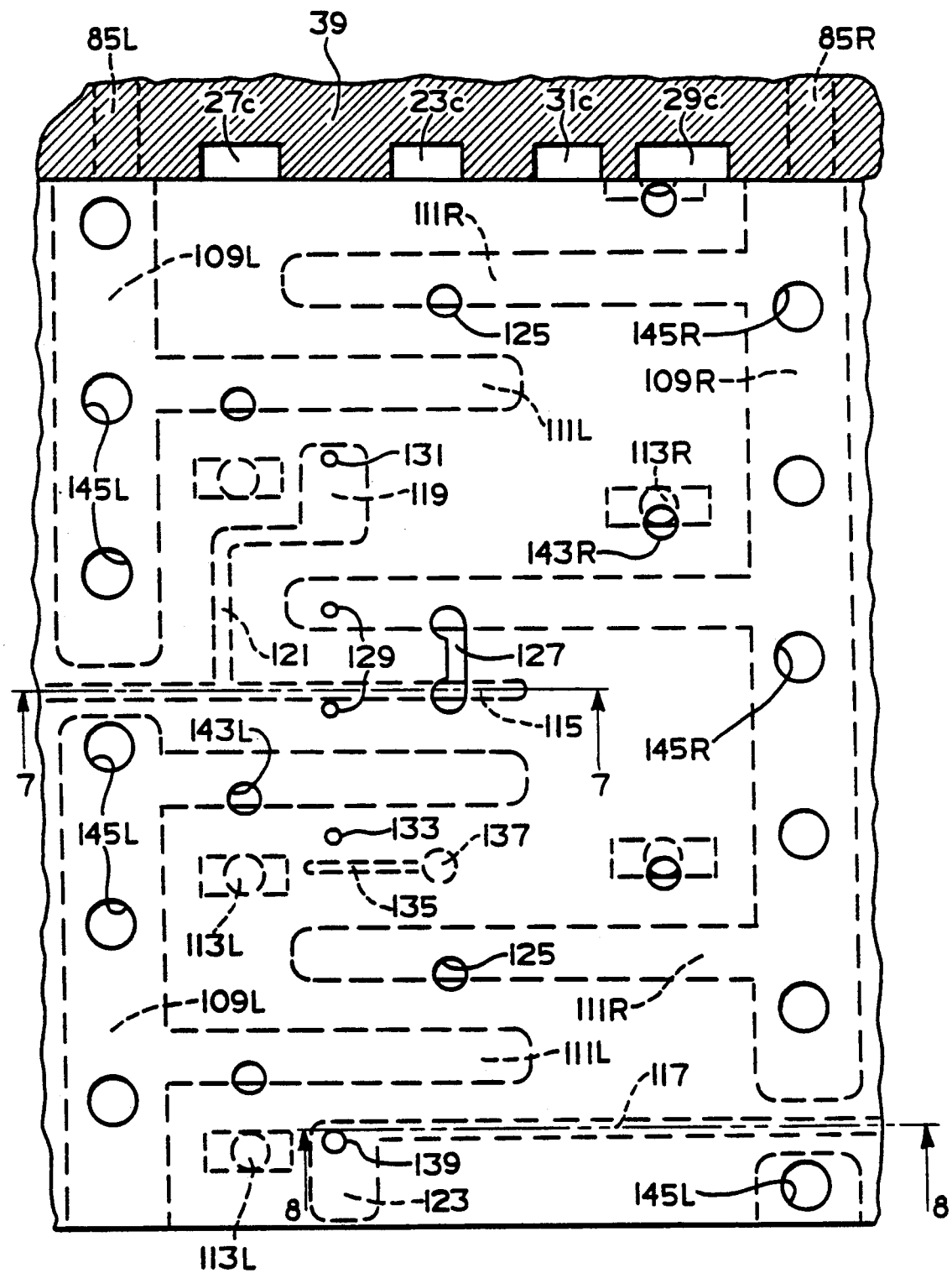
FIG. 6 is an enlarged, fragmentary overlay view, similar to FIG. 3, but with the valving displaced from the rotary neutral position to a rotary operating position.
Figure 7:
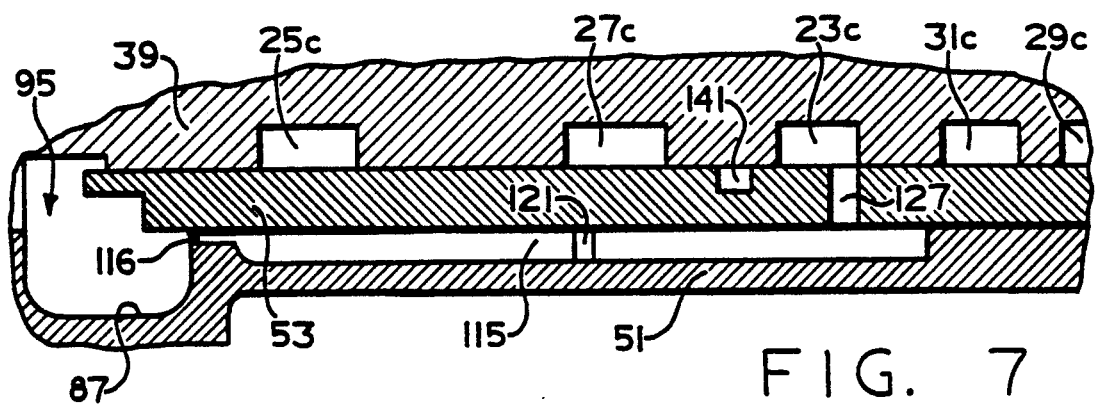
FIG. 7 is an enlarged, fragmentary, axial cross-section, taken on line 7—7 of FIG. 6, and on the same scale as FIG. 6.
Figure 8:
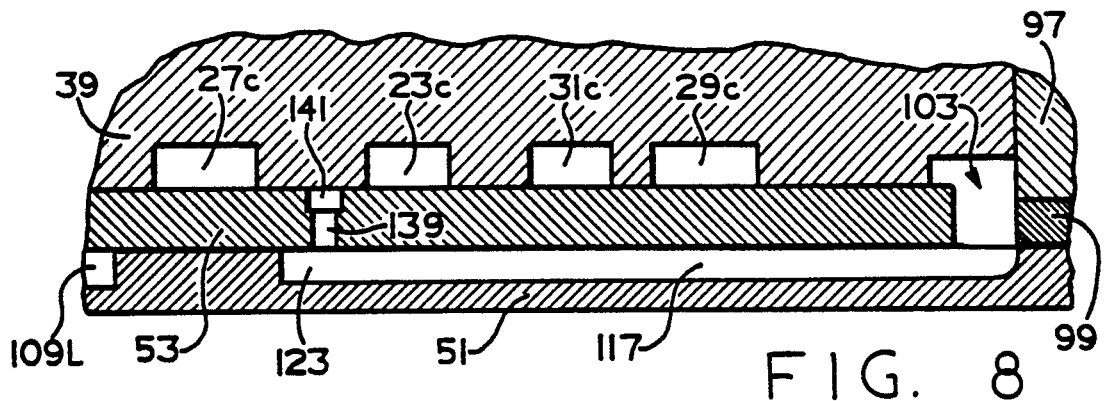
FIG. 8 is an enlarged, fragmentary, axial cross-section, taken on line 8—8 of FIG. 6, and on the same scale as FIG. 6.
Figure 10:
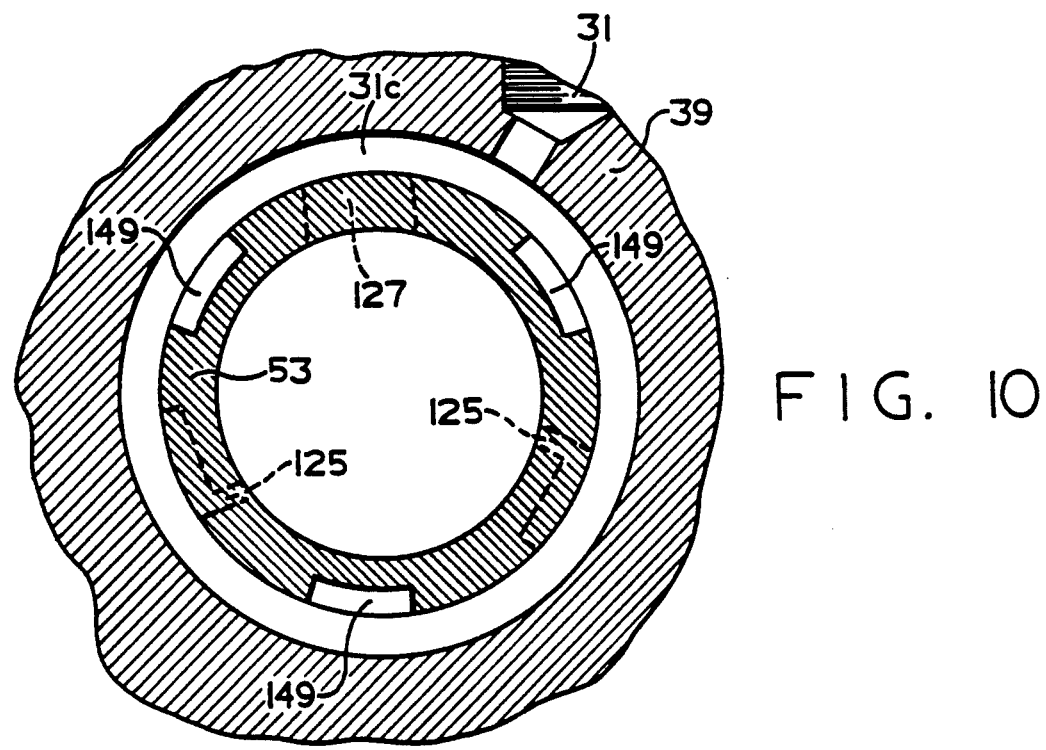
FIG. 10 is a fragmentary, transverse cross section, on approximately the same scale as FIGS. 3 through 5, taken on line 10—10 of FIG. 9.

Referring now to FIG. 2, in conjunction with FIGS. 5 and 6, the valve bore 49 of the valve housing 39 defines a plurality of annular fluid chambers surrounding the sleeve 53, to provide fluid communication between the various ports (23 through 31) and the outer surface of the sleeve 53. An annular chamber 23c receives pressurized fluid from the inlet port 23, while an annular chamber 25c communicates return fluid to the return port 25. An annular chamber 27c provides communication to or from the control port 27, while an annular chamber 29c provides communication to or from a control port 29. Finally, an annular chamber 31c provides communication with the excess flow port 31.

The toothed interaction of the star 59, orbiting and rotating within the ring 57, defines a plurality of expanding and contracting fluid volume chambers 79, and adjacent each such chamber 79, the spacer section 40 and the wear plate 41 define a fluid port 81. The valve housing 39 defines a plurality of axial bores 83 (only one of which is shown in FIG. 2), each of which is in open communication with one of the fluid ports 81. The valve housing 39 further defines a pair of radial bores 85L and 85R providing communication between each of the axial bores 83 and the valve bore 49, for purposes which will be described in greater detail subsequently.

It is believed that the normal rotary actuation of controller valving 35 of the general type shown in FIG. 1 is well known to those skilled in the art, and the operation of such valving will be described only briefly herein. As the steering wheel 17 is rotated, for example, in the clockwise direction, to achieve a right turn of the vehicle, the spool 51 is also rotated clockwise, as viewed by the vehicle operator, opening up a series of variable flow control orifices between the spool 51 and the sleeve 53. These orifices permit the fluid communication from the annular chamber 23c through one of such orifices, then through the radial bores 85R and the axial bore 83 to the expanding volume chambers 79 of the fluid meter 43. Fluid flowing from the contracting volume chambers 79 of the meter 43 flows through other of the axial bores 83, then through the radial bores 85L, and through another variable orifice in the controller valving 35, then out to the cylinder port 27. Fluid returning from the steering cylinder enters the cylinder port 29, then flows through another variable orifice in the controller valving 35, and then out to the return port 25. The above-described fluid path is typically referred to as the "main fluid path", and the use of that term hereinafter will be understood to mean the above-described fluid path or a portion thereof, (or an opposite fluid path which produces a left turn condition), when the spool and sleeve are in a rotary operating position.

It should be noted that all of the elements described up to this point are elements which are already at least generally known, and have been illustrated and described in the above-incorporated U.S. patents and co-pending applications. The newly added elements which comprise the various aspects of the present invention will now be described. In conventional controllers of the spool-sleeve type, which are presently commercially available, the area of the variable flow control orifices in the flow control valving is changed in response only to relative rotation between the spool and sleeve. Thus, in such controllers, it has been typical for the axial length of the sleeve to be the same as that of the spool (excluding the reduced diameter portion which defines the internal splines 55).

It is one important aspect of the present invention to be able to define variable flow control orifices in the valving 33, in response to both relative rotary motion of the spool 51 and sleeve 53, and axial motion of the sleeve 53 relative to the valve housing 39. In the subject embodiment, by way of example and not limitation, such axial motion is accomplished by making the sleeve 53 axially shorter than the adjacent portion of the spool 51, and providing means for axially displacing the sleeve 53 relative to the valve housing 39 (and relative to the spool 51), between two different axial positions. In the subject embodiment, again by way of example and not limitation, the interface between the spool 51 and the sleeve 53 defines, in response to relative rotation therebetween, the variable orifices which comprise the controller valving 35 (see FIG. 1), while the interface between the sleeve 53 and valve housing 39 defines, in response to relative axial motion, the variable orifices which comprise the priority flow control valving 37 (see FIG. 1).

Figure 2A:
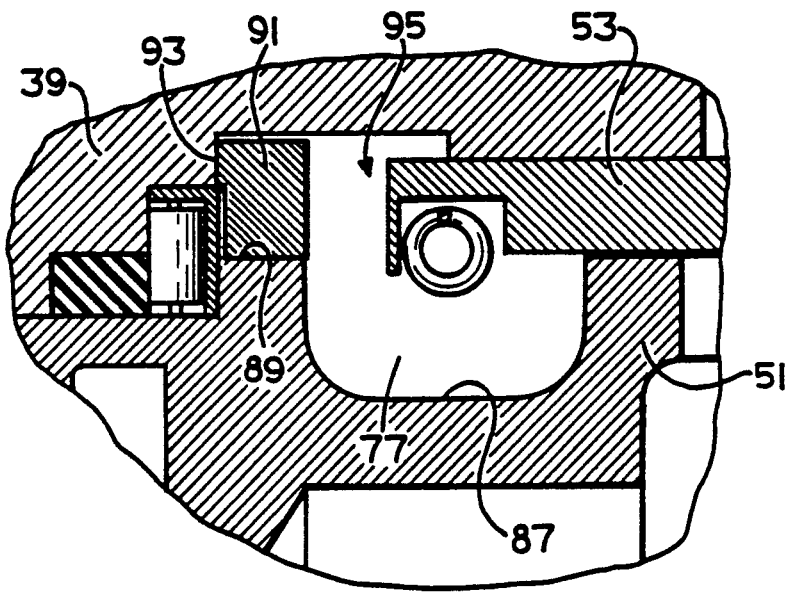
FIGS. 2A and 2B are enlarged, fragmentary, axial cross-sections, similar to FIG. 2, illustrating detailed aspects of the present invention.
Figure 2B:
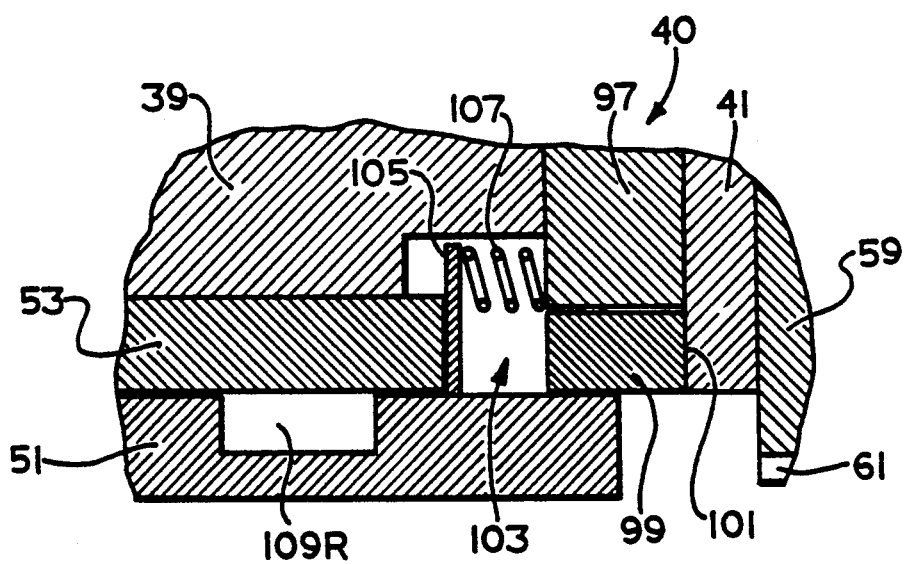

Referring now primarily to FIGS. 2A and 2B, the spool 51 defines, adjacent its forward end, an annular groove 87 which accommodates the spring 77 during axial movement of the sleeve 53. To the left of the annular groove 87, the spool 51 defines a forward land 89, and surrounding the land 89 is a precision, floating face seal 91 having a forward face seal surface 93 which seals against an adjacent interior surface defined by the valve housing 39. The forward end of the sleeve 53 and face seal 91 cooperate to define a pilot pressure chamber 95, the function of which will be described subsequently. The chamber 95 will typically contain fluid at system pressure (for example, 2500 PSI), and therefor, there needs to be a very close fit between the outer periphery of the forward land 89 and the I.D. of the face seal 91, to minimize the leakage of fluid therebetween. The face seal surface 93 is biased by the system pressure into tight sealing engagement with the adjacent surface of the housing 39.

Referring now to FIG. 2B, the spacer section 40 includes a spacer ring 97, and disposed radially inwardly from the ring 97 is a precision floating face seal 99. The I.D. of the face seal 99 has a close fit relationship with the adjacent O.D. of the spool 51, in the same manner as was described previously with regard to the face seal 91. The face seal 99 includes a face seal surface 101 which is pressed against the adjacent surface of the wear plate 41. The right end of the sleeve 53 cooperates with the spacer ring 97 and face seal 99 to define a load signal chamber 103, the function of which will be described subsequently. The face seal surface 101 is biased by the load signal pressure into tight sealing engagement with the adjacent surface of the wear plate 41.

Disposed against the right end of the sleeve 53 is a slip washer 105, and disposed between the washer 105 and the spacer ring 97 is a plurality of relatively small coiled compression springs 107, which bias the sleeve 53 to the left in FIGS. 2 and 2B, for reasons which will be described in greater detail subsequently.

Valving Arrangement

In connection with the subsequent description of the valving arrangement, and in the appended claims, various elements are referred to by the term "axial". It will be understood by those skilled in the art that such use of the term "axial" is not necessarily intended to define a structural feature of the particular element, or a particular orientation, but instead is intended to indicate that that particular element is related to the axial actuation of the sleeve 53, or is involved in defining the orifices of the priority flow control valving 37.

Figure 3:
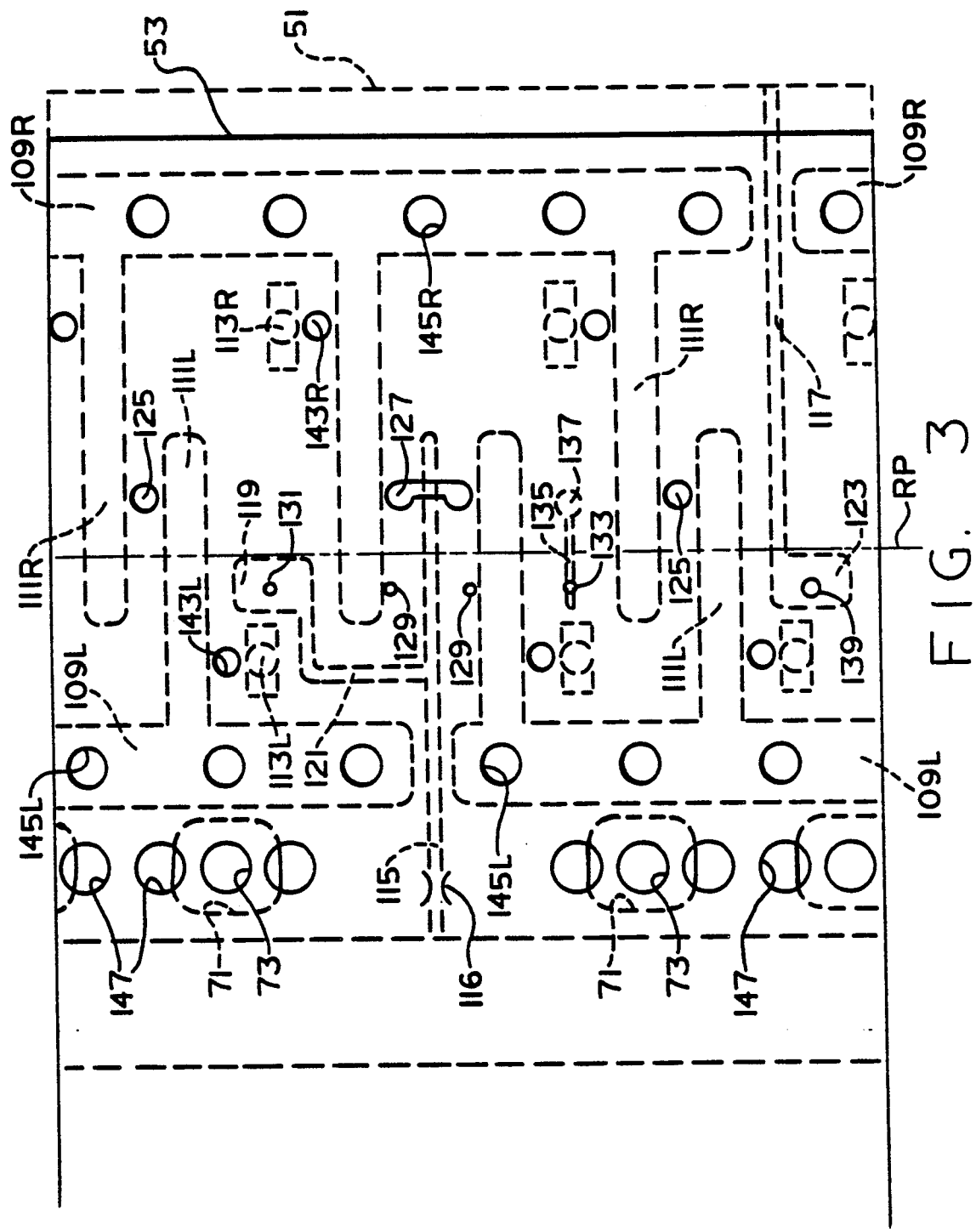
FIG. 3 is an overlay view of the valving used in the fluid controller shown in FIG. 2, but on a larger scale than in FIG. 2, with the valving in the rotary neutral position.

Referring now to FIG. 3, in conjunction with FIGS. 4 and 5, the spool 51 and sleeve 53 will be described in greater detail, with regard to the various ports and passages defined thereby. In connection with the subsequent description, it should be noted that many of the ports and passages are arranged symmetrically, or generally symmetrically, with respect to an imaginary central reference plane RP passing through the chamber 23c, and such elements will be described by a reference numeral followed by either an R or an L to indicate that the element is located on either the right side or the left side, respectively, of the central reference plane RP. On the other hand, certain of the other elements do not have a corresponding element oppositely disposed about the reference plane RP, and will be referred to by use of a reference numeral alone.

Figure 9:
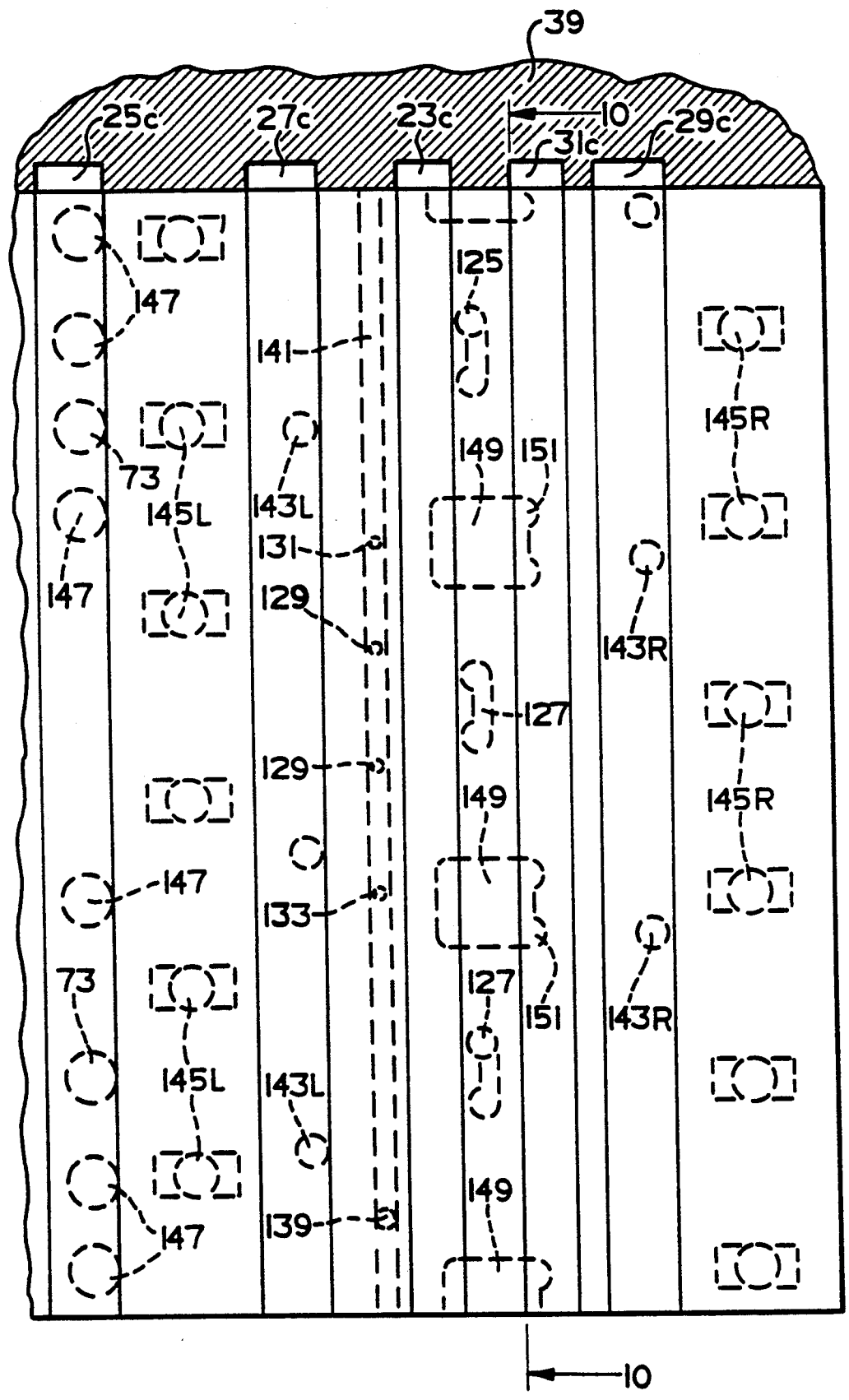
FIG. 9 is an overlay view, on a smaller scale than FIG. 8, with the valving in the express flow position, but illustrating the interface of the housing and the follow-up valve member.

It should be understood that the various overlay views, such as FIG. 3, are intended to illustrate primarily the interface between the spool 51 (dashed lines) and the sleeve 53 (solid lines), and as a result, certain structural features which appear only on the outer surface of the sleeve 53 will be shown only in FIGS. 5 and 9, but will not be shown in the spool-sleeve overlay views.

Referring now to only FIGS. 3 and 4, the spool 51 defines a pair of generally annular meter grooves 109L and 109R, which are axially aligned with the radial bores 85L and 85R, respectively. In communication with the meter groove 109L is a plurality of pressure passages 111L, and in communication with the meter groove 109R is a plurality of pressure passages 111R. Adjacent each pressure passage 111L is a tank port 113L, and adjacent each pressure passage 111R is a tank port 113R. To the left of the meter groove 109L, the spool 51 defines the pin openings 71, the other function of which will be described subsequently.

In conventional spool-sleeve fluid controllers, the annular meter grooves have been circumferentially continuous, i.e., they have extended about the entire 360 degree circumference of the spool, without interruption. However, referring still primarily to FIG. 3, it is one important aspect of the present invention that the meter grooves 109L and 109R are interrupted, for reasons which will now be described. The spool 51 defines an axially-extending pilot pressure passage 115, which extends to the left in FIG. 3, to the annular groove 87 defined by the spool, but more importantly, provides fluid communication to the pilot pressure chamber 95 disposed adjacent the end of the sleeve 53, through a pilot orifice 116 (see FIGS. 1, 3, 6, and 7). Similarly, the spool 51 defines an axially-extending load signal passage 117, which extends to the right in FIG. 3 to the end of the spool, but more importantly, provides fluid communication to the load signal chamber 103. Preferably, the controller would include a load signal relief valve 118, shown only in FIG. 1, such relief valves being well known in the art. The spool 51 further defines a dynamic signal recess 119, which is in open communication with the pilot pressure passage 115 by means of a passage 121 which extends first circumferentially, then axially. Similarly, the spool 51 defines a load signal recess 123, disposed at the left end of the load signal passage 117, and in communication therewith.

The sleeve 53 defines a pair of pressure ports 125, disposed to the right of the imaginary reference plane RP. Disposed circumferentially between the ports 125 is a pilot port 127, the function of which will be described subsequently. Disposed to the left of the pilot port 127 is a pair of load sensing pickup ports 129, and circumferentially disposed from the ports 129 (and not shown in FIG. 5) is a dynamic signal pickup port 131, which is in continuous communication with the dynamic signal recess 119. Also circumferentially disposed from the ports 129 is a load signal drain port 133, which is in communication with a drain passage 135 defined by the spool 51, whenever the spool and sleeve are in the rotary neutral position as shown in FIG. 3. The drain passage 135 is in communication with a drain port 137, which communicates with the interior of the spool in the same manner as do the tank ports 113L and 113R. Finally, further circumferentially disposed from the ports 129 is a load signal port 139, which is in continuous communication with the load signal recess 123. All of the ports 129, 131, 133, and 139 are in open communication with an annular load sensing groove 141, defined on the outer surface of the sleeve 53 (see FIG. 5).

The sleeve 53 further defines a plurality of operating ports 143L, disposed in axial alignment with the tank ports 113L, and in continuous communication with the chamber 27c. Similarly, the sleeve 53 defines a plurality of operating ports 143R, in axial alignment with the tank ports 113R, and in continuous communication with the chamber 29c. Disposed further axially outward from the reference plane RP, the sleeve defines a plurality of meter ports 145L, each of which is in continuous communication with the meter groove 109L, and in commutating fluid communication with the radial bores 85L. Similarly, the sleeve defines a plurality of meter ports 145R, each of which is in continuous communication with the meter groove 109R, and in commutating fluid communication with the radial bores 85L. Finally, the sleeve 53 defines a plurality of tank ports 147, which are axially aligned with the openings 73, which receive the drive pin 69, and are in continuous fluid communication with the chamber 25c.

Referring now primarily to FIG. 5, it should be noted that each of the meter ports 145L and 145R includes a generally rectangular opening defined by the outer surface of the sleeve 53. The purpose of the rectangular openings is to permit commutating fluid communication between the meter ports 145L and 145R and the radial bores 85L and 85R, respectively, even as the sleeve is being axially displaced from the neutral position shown in FIG. 3.

Rotary Operating Position

Figure 12:
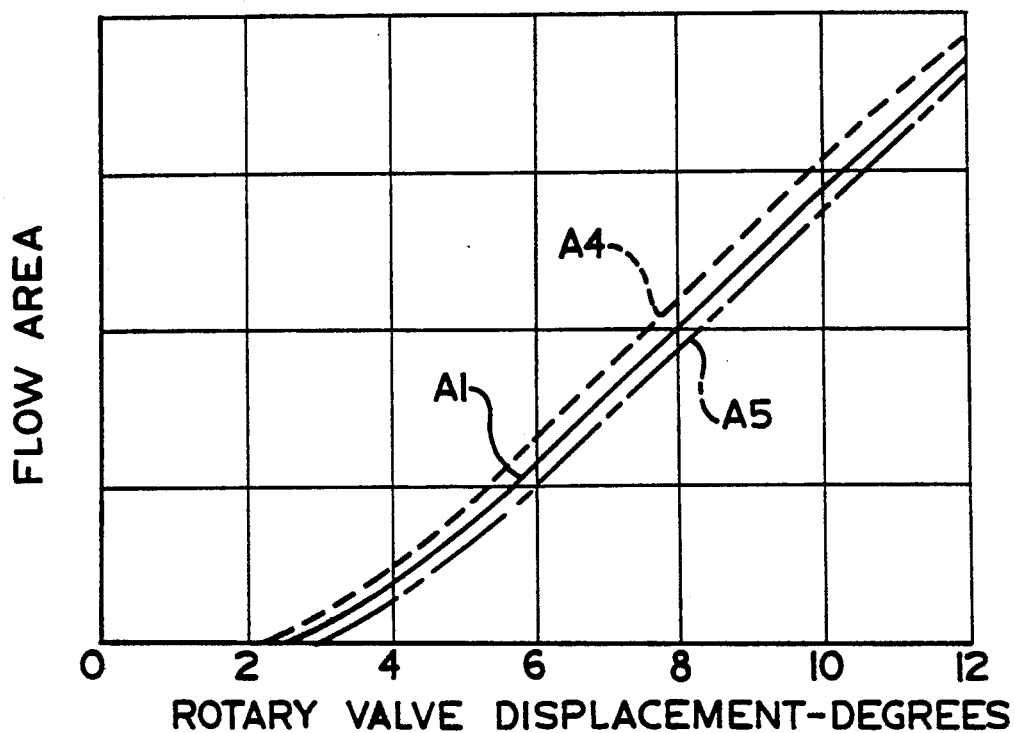
FIG. 12 is a graph of flow area versus rotary valve displacement, illustrating the various controller flow control orifices of the present invention.

Referring now to FIG. 6, if the steering wheel 17 and the spool 51 are rotated clockwise (i.e., the spool 51 moves "down" in FIG. 6), pressurized fluid flows from the chamber 23c through the pressure ports 125, into the pressure passages 111R, the overlap therebetween cumulatively defining a main variable flow control orifice A1, see FIG. 1. This "unmetered" fluid flows from the pressure passages 111R into the meter groove 109R, then through the meter ports 145R to the expanding volume chambers 79 of the fluid meter 43. "Metered" fluid flows from the contracting volume chambers 79 of the fluid meter, and flows into the meter ports 145L, then through the meter groove 109L into the pressure passages 111L. The passages 111L are now overlapped by the operating ports 143L, the cumulative overlap therebetween defining a variable flow control orifice A4 (see FIG. 1). Metered fluid flows from the A4 orifice into the chamber 27c, and from there to the control port 27 and then to the steering cylinder 19. Fluid returning from the exhaust side of the steering cylinder flows to the control port 29, then into the annular chamber 29c, and into a variable flow control orifice (A5) defined by the cumulative overlap of the operating ports 143R and the tank ports 113R. The low pressure exhaust fluid flows from the A5 orifice to the interior of the spool 51, then radially outwardly through the pin openings 71, and through the tank ports 147 into the chamber 25c, and from there to the return port 25. The "gain", i.e., the relationship of the flow area to the rotary spool-sleeve displacement, for each of the A1, A4, and A5 variable flow control orifices is preferably as is well known in the art, and may be seen in the graph of FIG. 12.

The above-described flow path comprises the main fluid path defined by the controller valving 35 when the spool 51 and sleeve 53 are displaced from the neutral rotary position of FIG. 3 to a rotary operating position (as illustrated in FIG. 6). It should be noted that the controller valving has been described as being at the interface of the spool and sleeve, because that is where the A1, A4, and A5 orifices are defined. However, as is conventional, and well known in the art, the commutating communication to and from the fluid meter 43 (which is part of the controller valving) occurs at the interface of the sleeve and housing, i.e., between the meter ports 145L and 145R and the radial bores 85L and 85R, respectively.

However, it should be noted that in both FIGS. 3 and 6, the sleeve is in what might be considered its "normal" axial position, biased to the left in FIGS. 3 and 6, by means which will now be described. Referring still to FIG. 6, the pilot port 127 is also in communication with the chamber 23c, and receives pressurized fluid therefrom which, in turn, is communicated therethrough and into the pilot pressure passage 115, through the pilot orifice 116, to the pilot pressure chamber 95. The result is that the sleeve 53 is being biased to the right in FIG. 6 by fluid pressure in the pilot pressure chamber 95 which is at the pressure of the main fluid path, upstream of the A1 orifice. At the same time, the "upper" (in FIG. 6) of the two load sensing pickup ports 129 is in communication with the pressure passage 111R, and therefor, is communicating into the load sensing groove 141 the pressure of the main fluid path downstream of the A1 orifice (typically referred to as the "load pressure"). The load pressure in the groove 141 is communicated through the load sensing port 139 into the load signal recess 123, and from there through the load signal passage 117 into the load signal chamber 103. As a result, the sleeve 53 is being biased to the left in FIG. 6 by a combination of the load pressure and the compression springs 107. As is well known to those skilled in the load sensing priority flow control art, the biasing force of the springs 107 is selected to be approximately equal to the pressure drop across the A1 orifice (i.e., the difference between the pressure in the pilot pressure chamber 95 and the pressure in the load signal chamber 103). When the opposing forces biasing the sleeve 51 are approximately balanced, the sleeve is biased to the left, as shown in FIG. 6, and the pressure ports 125 and the pilot port 127 are in open, unrestricted fluid communication with the chamber 23c, communicating with the inlet port 23.

Priority Flow Control Valving 37

Referring now primarily to FIGS. 5 and 9, certain additional structural features associated with the priority flow control valving will be described. It should be noted that in the overlay view of FIG. 9, unlike FIGS. 3, 6, and 11, what is being shown is the outer surface of the sleeve 53 (dashed lines) and the surface of the valve bore 49 (solid lines). The outer surface of the sleeve 53 defines a plurality of recessed, axially-extending fluid passages 149. By "recessed" it is meant that the passages 149 are formed only on the outer surface, and do not extend radially through to the interior of the sleeve, which is the reason for the passages 149 not appearing in FIGS. 3 and 6. The left end of each of the passages 149 is in continuous fluid communication with the pressure chamber 23c, and at its right end, each of the passages 149 includes a pair of arcuate metering portions 151.

Figure 13:
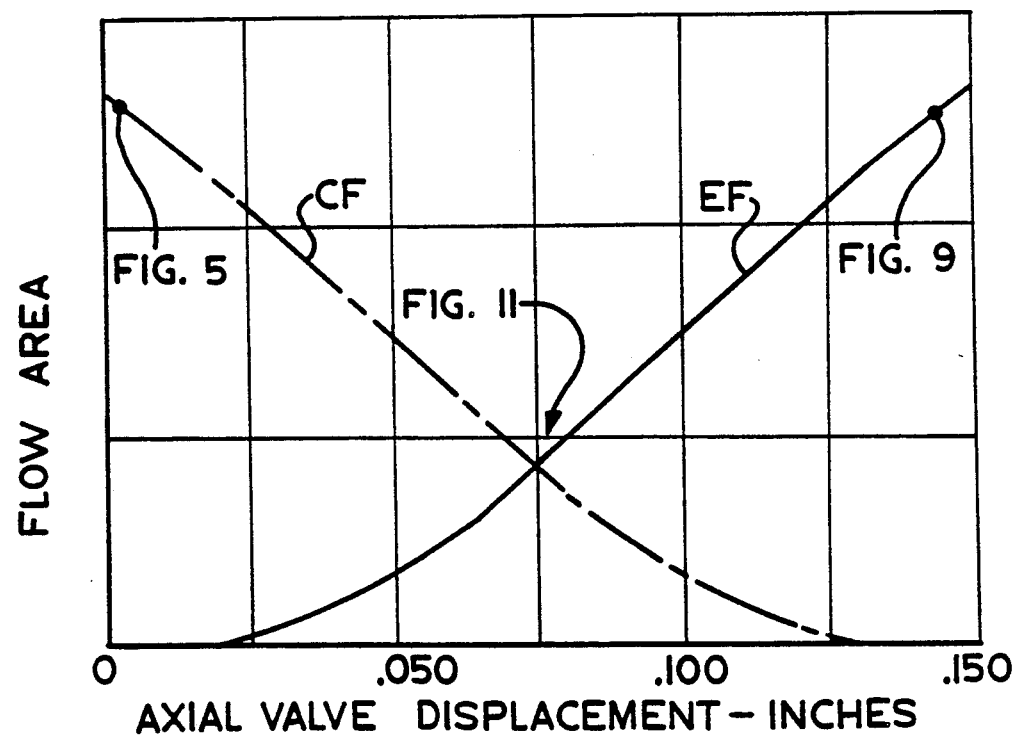
FIG. 13 is a graph of flow area versus axial valve displacement, illustrating the priority valve flow control orifices in accordance with the present invention.

As may best be seen in FIG. 5, when the controller valving 35 is demanding all of the fluid being delivered by the pump 11, the sleeve 53 is biased to the left, to a position in which the metering portions 151 are disposed to the left of the auxiliary chamber 31c and out of fluid communication therewith. See in the graph of FIG. 13 the curve labeled "CF", which represents the flow area through the pressure ports 125, and more particularly, the point on the "CF" curve labeled "FIG. 5". In this situation, the entire fluid delivery of the pump 11 flows through the chamber 23c, and through the pressure ports 125 and pilot port 127, as was previously described, such that the entire fluid delivery is utilized by the controller valving 35 (and the steering cylinder 19).

When the fluid delivery of the pump 11 begins to exceed the flow required by the controller valving 35 (or stated another way, when the demand for fluid by the controller valving 35 drops below the delivery of the pump 11), the pressure drop across the variable flow control orifice A1 begins to increase, i.e., the pressure in the pilot pressure chamber 95 exceeds the pressure in the load signal chamber 103 by an amount slightly greater than the equivalent pressure of the compression springs 107. As this occurs, the sleeve 53 begins to shift to the right, toward the position shown in FIG. 9. As the sleeve moves to the right, the fluid communication between the pressure ports 125 and the chamber 23c begins to decrease, the cumulative overlap therebetween defining a priority flow control orifice CF, represented by the curve labeled "CF" in FIG. 13. At the same time, the pilot port 127 is also moving out of full fluid communication with the chamber 23c, until a point is reached at which a pair of metering portions 153 defined by the pilot port 127 are metering just enough fluid from the chamber 23c to maintain the fluid pressure in the pilot pressure chamber 95, and maintain that particular position of the sleeve 53.

As the sleeve 53 moves toward the position shown in FIG. 9, the metering portions 151 of the passages 149 begin to communicate with the auxiliary chamber 31c, the cumulative overlap therebetween defining an auxiliary flow control orifice EF. See the curve labeled "EF", in the graph of FIG. 13, and more particularly, the point on the EF curve labeled "FIG. 9".

As will be understood by those skilled in the art, when the vehicle engine is started and the pump 11 begins to operate, there is initially no fluid pressure in the pilot pressure chamber 95 or the load signal chamber 103. At the same time, without any steering input by means of the steering wheel 17, the centering spring arrangement 75 has the spool and sleeve biased toward the rotary neutral position. Therefore, the spool and sleeve are in the relative position shown in FIG. 3, and the sleeve and housing are in the relative position shown in FIG. 5. As the fluid output from the pump 11 begins to flow into the controller 15, pressurized fluid builds in the priority chamber 23c, with a portion of the fluid flowing from there through the pilot port 127 into the pilot pressure passage 115, and from there into the pilot pressure chamber 95, in the manner described previously. If there is still no steering input, the spool and sleeve remain in the rotary neutral position shown in FIG. 3, but the pressure buildup in the pilot pressure chamber 95 biases the sleeve 53 to the right in FIGS. 3 and 5, until the metering portions 151 begin to meter fluid from the priority chamber 23c to the auxiliary chamber 31c.

Figure 11:
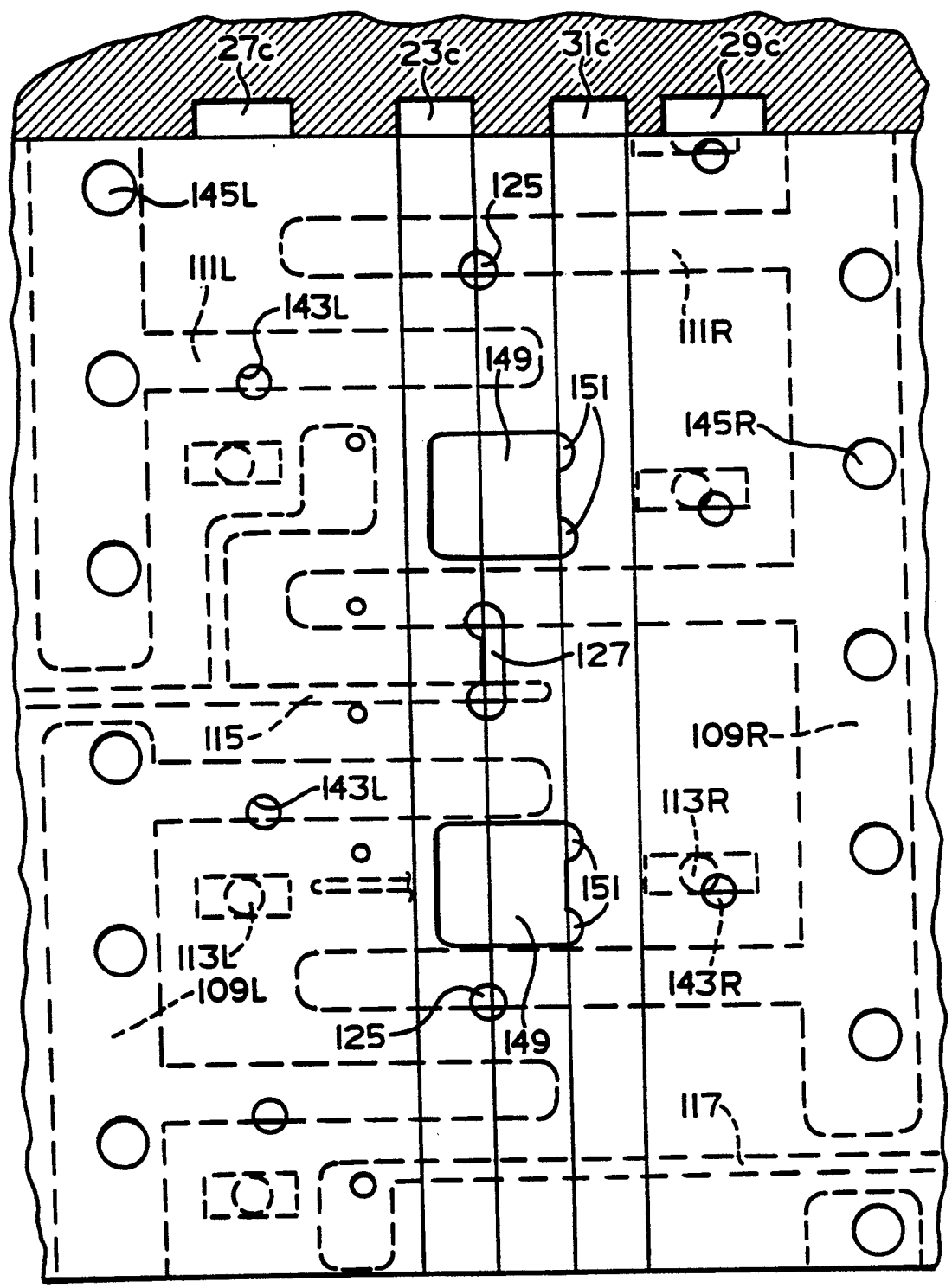
FIG. 11 is an enlarged, fragmentary overlay view, similar to FIG. 6, and on the same scale as in FIG. 6, but with the valving in both the rotary position and an excess flow position.

Referring now to FIG. 11, it will be assumed that, in connection with the operation just described, the vehicle operator begins to turn the steering wheel 17. As the spool 51 begins to rotate, relative to the sleeve 53, approaching a position such as is shown in FIG. 6, in which steering occurs, load signal pickup port 129 communicates with its respective pressure passage 111R, and a steering load pressure signal is transmitted through the port 129 into the load signal groove 141, and from there through the port 139 and recess 123, then through the passage 117 into the load signal chamber 103 in the manner described previously. As the load signal pressure begins to build in the chamber 103, the sleeve 53 is biased somewhat toward the left, to the position illustrated in FIG. 11, in which both the controller valving 35 and priority flow control valving 37 are operating. In this particular operating condition, it may be seen in FIG. 11 that the pressure ports 125 are in communication with the priority chamber 23c to define the priority flow control orifice CF, and at the same time the metering portions 151 are in communication with the auxiliary chamber 31c to define the auxiliary flow control orifice EF. See in the graph of FIG. 13 the region where the CF and EF curves intersect, labeled "FIG. 11".

Figure 14:
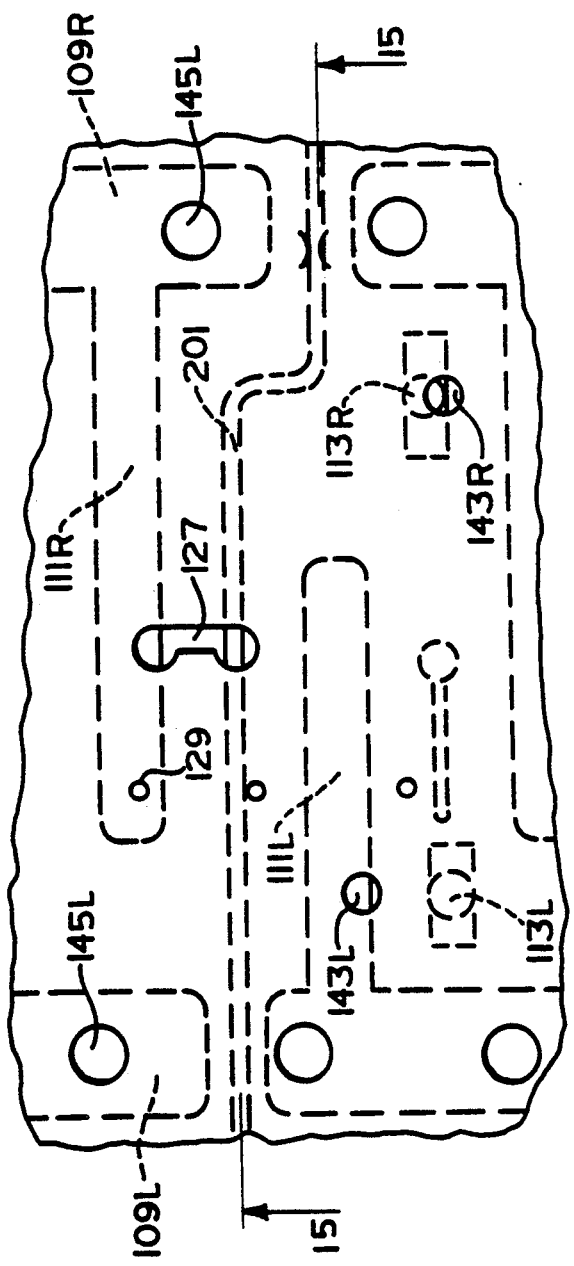
FIG. 14 is an enlarged, fragmentary overlay view, similar to FIG. 3, illustrating an alternative embodiment of the present invention.
Figure 15:
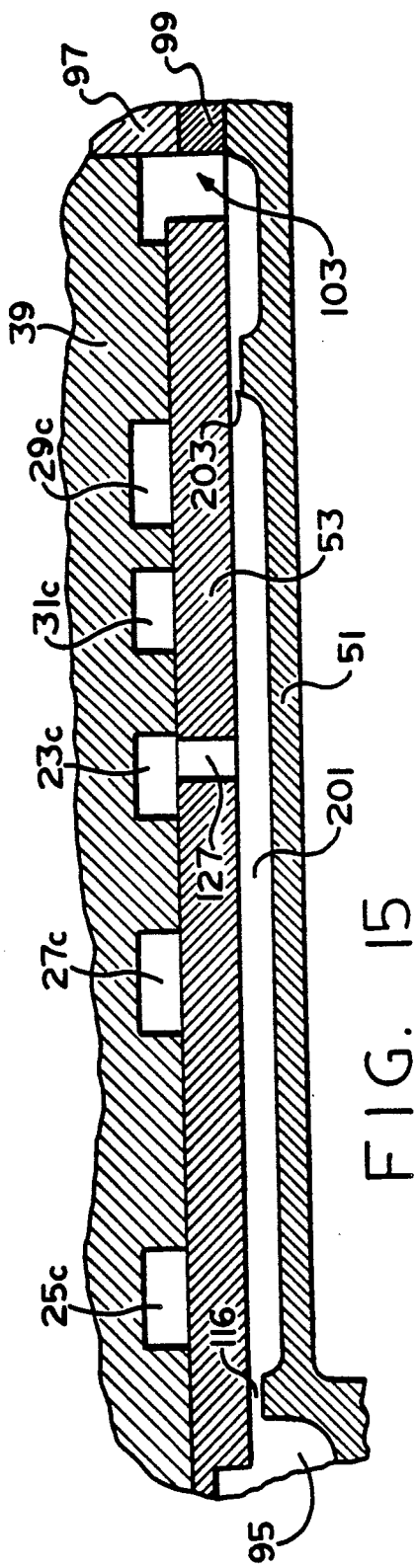
FIG. 15 is a fragmentary, axial cross-section taken on line 15—15 of FIG. 14, and on the same scale as FIG. 14.

Alternative Embodiment - FIGS. 14 and 15

There will now be described briefly an alternative embodiment of the present invention in which like elements bear like numerals, whereas new or substantially modified elements will bear numerals in excess of "200". By comparing FIG. 14 to FIG. 6, it may be seen that the dynamic signal recess 119 and passage 121 have been removed from the spool 51, and the dynamic signal pickup port 131 has been removed from the sleeve 53. In addition, the pilot pressure passage 115 on the surface of the spool has been replace by passage 201 which serves two purposes. The passage 201 is in communication with the pilot port 127, and directs pilot pressure through the pilot orifice 116 to the pilot pressure chamber 195 in the manner described previously. At the same time, a portion of the fluid received from the pilot port 127 flows to the right in FIGS. 14 and 15, through a dynamic signal orifice 203, and directly into the load signal chamber 103. It is considered advisable to have signal orifices such as the dynamic signal orifice 203, disposed physically near the particular signal chamber, such as load signal chamber 103. Such proximity is believed to improve the dynamic response of the valving, i.e., the speed with which the controller is able to respond to changes in the pressure of the various signals which control the axial position of the sleeve 53.

Figure 16:
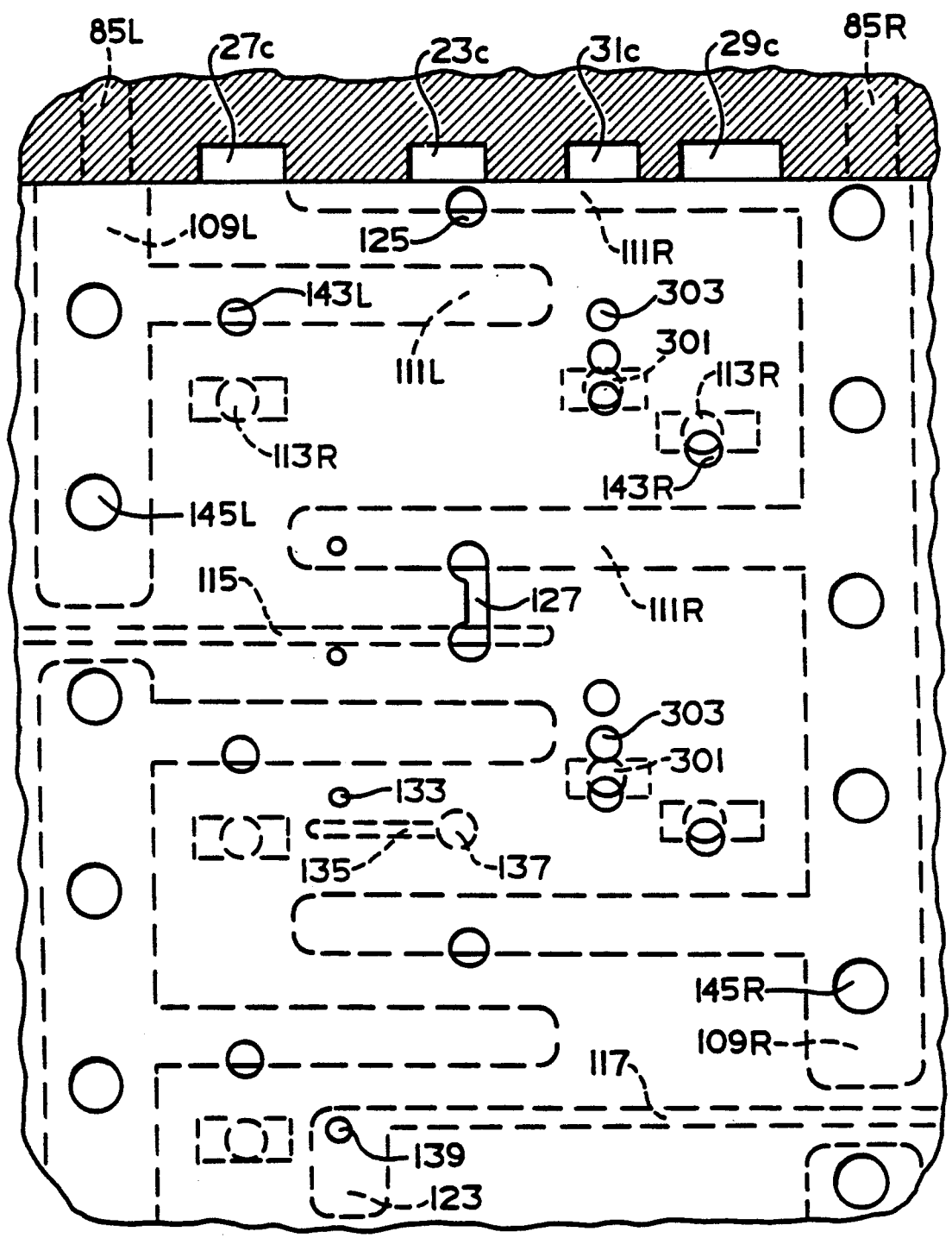
FIG. 16 is a fragmentary overlay view, similar to FIG. 6, but illustrating yet another alternative embodiment of the present invention.

Alternative Embodiment - FIG. 16

Referring now to FIG. 16, there is illustrated another alternative embodiment of the present invention, in which like elements bear like numerals, and new or substantially modified elements bear reference numerals in excess of "300". Referring also to FIG. 1, the purpose of the embodiment of FIG. 16 is to provide a controller for use in those applications where there is no downstream auxiliary load circuit, but the customer does want to maintain a predetermined pressure differential across the A1 orifice of the controller valving 35, without the need for separate, external valving or pump controls In other words, what is desired is pressure compensation within the controller 15.

In this embodiment, one of the modifications, referring to FIG. 1, is to eliminate the excess flow port 31, and the excess flow chamber 31c is therefor no longer connected to an external port. The previous embodiments would be referred to as "5-port" units, whereas the embodiment of FIG. 16 would be referred to as a "4-port" unit. In a 4-port unit, the excess flow, i.e., all flow entering the inlet port 23 which is in excess of that required by the controller valving 35 is simply returned to the system reservoir 13 in a manner well known in the pressure compensation art.

Referring now to FIG. 16, another modification, as compared to the previous embodiments, is that there is no dynamic signal being communicated from the pilot port 127 (or anywhere else) into any portion of the load signal circuit. Instead, this embodiment is a "static" load signal device.

It should be noted that in FIG. 16, only the interior of the sleeve 53 and the exterior of the spool 51 are shown, in the same manner as FIG. 6, and therefor, the fluid passages 149 which are on only the surface of the sleeve are not shown, although they are still present, and are still used to serve the same function, i.e., providing communication from the inlet chamber 23c to the excess flow chamber 31c when the sleeve is biased to the right in FIG. 16.

The spool 51 is provided with several drain ports 301, extending from the exterior surface of the spool to the interior thereof, such that the ports 301 may be considered as being in fluid communication with the return port 25. Each drain port 301 includes a rectangular recess on the surface of the spool, in much the same manner as the tank ports 113L and 113R, and for the same purpose, i.e., to accommodate relative axial movement between the spool and sleeve and still maintain fluid communication.

The sleeve 51 defines, adjacent each drain port 301, three excess ports 303. When the spool and sleeve are in the rotary neutral position (shown in FIG. 3), the middle port 303 is in direct communication with the drain port 301. As the spool and sleeve undergo relative rotation in either direction of operation, there will still be one of the excess ports 303 capable of providing fluid communication from the excess flow chamber 31c to the drain port 301.

As the fluid pressure in the pilot port 127 rises above that needed to maintain the desired pressure differential across the A1 orifice, the sleeve 53 begins to shift to the right in FIG. 16, in the same manner as described previously, until the metering portions 151 of the fluid passages 149 begin to meter fluid from the chamber 23c to the chamber 31c, from where the excess fluid flows through the excess ports 303, then through the drain port 301 to the return port 25, as was described previously.

Therefore, it should be understood that reference in the claims to an "auxiliary fluid location" may mean and include either the separate auxiliary load circuit 21, or the excess flow chamber 31c, merely communicating with the system reservoir 13.

In the various embodiments shown, communication between the main fluid path (upstream or downstream of the A1 orifice) and the pilot pressure chamber 95 and load signal chamber 103 has been accomplished by means of fluid passages 115 and 117, respectively, defined by the outer surface of the spool 51. It should be understood that within the scope of the present invention, the various pilot, dynamic signal, and load signal passages could be defined by the housing, or by a combination of the housing and the spool and sleeve valve members. Most likely, if the passages were defined by the housing, it would still be preferable to have the spool and sleeve define the various orifices, such as the pilot orifice 116, or the dynamic signal orifice 203. As was mentioned earlier in the specification, the present invention may be utilized in a load sensing system, i.e., where the fixed displacement pump 11 is replaced by a load sensing pump, thus requiring that the controller 15 have a load signal port to connect some portion of the load signal circuit to the flow and pressure compensator portion of the pump, and also to a load signal associated with the auxiliary circuit. Preferably, if the controller is to be used in a load sensing system, the pilot and load signal circuits should be defined at least partially within the housing, to facilitate pick up and communication to the external circuit.

The invention has been described in great detail, sufficient to enable one skilled in the art to make and use the same. Various alterations and modifications of the invention will occur to those skilled in the art upon a reading and understanding of the foregoing specification, and it is intended to include all such alterations and modifications as part of the invention, insofar as they come within the scope of the appended claims.

I claim:

1. A controller operable to control the flow of fluid from a source of pressurized fluid to a priority fluid pressure operated device, and to an auxiliary fluid location; said controller being of the type including housing means defining an inlet port for connection to the source of pressurized fluid, and first and second control fluid ports for connection to the priority fluid pressure operated device; valve means disposed in said housing means, and comprising a primary, rotatable valve member and a cooperating, relatively rotatable follow-up valve member, said primary and follow-up valve members defining a neutral rotary position, a rotary operating position in which said primary valve member is rotatably displaced from said neutral rotary position, relative to said follow-up valve member, and said follow-up valve member defining a first axial position; said primary valve member defining first and second fluid passages, and said follow-up valve member defining a first fluid port in continuous fluid communication with said inlet port when said valve members are in said first axial position, and a second fluid port in continuous fluid communication with said first control fluid port; said first fluid port being blocked from fluid communication with said first fluid passage, and said second fluid port being blocked from fluid communication with said second fluid passage when said valve members are in said neutral rotary position; said first fluid port being in fluid communication with said first fluid passage, to define a first variable flow control orifice, and said second fluid port being in fluid communication with said second fluid passage, to define a second variable flow control orifice when said valve members are in said rotary operating position; said housing means and said valve members cooperating to define a main fluid path providing fluid communication between said first and second variable flow control orifices when said valve members are in said rotary operating position; characterized by:
 (a) said follow-up valve member defining a second axial position;
 (b) said controller including means operable to bias said follow-up valve member toward said first axial position, and means operable to bias said valve members toward said second axial position;
 (c) said housing means and said follow-up valve member cooperating to define a pressure fluid chamber in continuous fluid communication with said inlet port, and an auxiliary fluid chamber in continuous fluid communication with an excess flow port;
 (d) said first fluid port being blocked from fluid communication with said pressure fluid chamber when said follow-up valve member is in said second axial position; and
 (e) said housing means and said follow-up valve member cooperating to define an axial fluid passage disposed to provide communication from said pressure fluid chamber to said auxiliary fluid chamber when said follow-up valve member is in said second axial position.

2. A controller as claimed in claim 1 characterized by said primary valve member defining a third fluid passage, and said follow-up valve member defining a third fluid port in continuous fluid communication with said second control fluid port, and a fourth fluid port in continuous fluid communication with a return port; said third and fourth fluid ports being blocked from fluid communication with said third fluid passage when said valves members are in said neutral rotary position; said third and fourth fluid ports being in fluid communication with said third fluid passage, to define at least a third variable flow control orifice, when said valve members are in said rotary operating position.

3. A controller as claimed in claim 1 characterized by said follow-up valve member defining a load sensing passage, said load sensing passage being blocked from fluid communication with said first fluid passage when said valve members are in said neutral rotary position, said load sensing passage being in fluid communication with said first fluid passage when said valve members are in said rotary operating position.

4. A controller as claimed in claim 3, characterized by said follow-up valve member and said housing means cooperating to define a load signal chamber in continuous fluid communication with said load sensing passage, said means operable to bias said follow-up valve member toward said first axial position including the fluid pressure in said load signal chamber.

5. A controller as claimed in claim 4, characterized by said primary valve member defining an axially-extending passage on the exterior surface thereof, disposed to provide continuous fluid communication between said load sensing passage, and said load signal chamber.

6. A controller as claimed in claim 1, characterized by said follow-up valve member and said housing means cooperating to define a pilot pressure chamber in continuous fluid communications with said pressure fluid chamber when said follow-up valve member is in said first axial position, said means operable to bias said follow-up valve member toward said second axial position comprising the fluid pressure in said pilot pressure chamber.

7. A controller as claimed in claim 6, characterized by said primary valve member defining an axially-extending passage on the exterior surface thereof, disposed to provide continuous fluid communication between said pressure fluid chamber and said pilot pressure chamber, a pilot port, defined by said follow-up valve member, and said pilot pressure chamber.

8. A controller as claimed in claim 1 characterized by fluid actuated means for imparting follow-up movement to said follow-up valve member proportional to the volume of fluid flow through said main fluid path when said valve members are in said rotary operating position.

9. A controller as claimed in claim 8 characterized by said primary valve member defining first and second meter grooves, and said follow-up valve member defining first and second sets of meter ports, in continuous fluid communication with said first and second meter grooves, respectively; said housing means defining first and second meter passage means in continuous fluid communication with expanding and contracting fluid volume chambers, respectively, defined by said fluid actuated means, said first and second sets of meter ports being in commutating fluid communication with said first and second meter passage means, respectively, in response to fluid flow through said main fluid path and rotation of said follow-up valve member.

10. A controller as claimed in claim 9, characterized by each of said first and second meter grooves comprising a groove defined on the exterior surface of said primary valve member, and extending circumferentially about at least a major portion of the circumferential extent of said primary valve member.

11. A controller as claimed in claim 9, characterized by said follow-up valve member and said housing means cooperating to define a pilot pressure chamber in fluid communication with said main fluid path upstream of said first variable flow control orifice, and further cooperating to define a load signal chamber in continuous fluid communication with said main fluid path downstream of said first variable flow control orifice.

12. A controller as claimed in claim 11, characterized by said primary valve member 51 defining an axially-extending passage on the exterior surface thereof, said passage providing fluid communication between said main fluid path and said pilot pressure chamber, said axially-extending passage extending axially past one of said first and second meter grooves at a circumferential discontinuity of said meter groove.

13. A controller as claimed in claim 11, characterized by said primary valve member defining an axially-extending passage on the exterior surface thereof, the passage providing fluid communication between said main fluid path and said load signal chamber, said axially-extending passage extending axially past one of said first and second meter grooves at a circumferential discontinuity of said meter groove.

14. A controller as claimed in claim 1 characterized by said primary and follow-up valve members cooperating with said housing means to define first and second axial chambers, and further characterized by said first and second axial chambers including said means operable to bias said follow-up valve member toward said first and second axial positions, respectively.

15. A controller as claimed in claim 1, characterized by said housing means defining a return port for connection to a reservoir, said auxiliary fluid location comprising an auxiliary fluid pressure operated device.

16. A system including a source of pressurized fluid, a priority fluid pressure operated device, an auxiliary fluid pressure operated device, a controller, controller valve means operable to control the flow of fluid to the priority fluid pressure operated device, and load sensing priority flow control valve means operable to control the flow of fluid to the controller valve means and to the auxiliary fluid pressure operate device; said controller including housing means defining first and second control fluid ports for connection to the priority fluid pressure operated device; and valve means disposed in said housing means and comprising a primary, rotatable valve member and a cooperating, relatively rotatable follow-up valve member, said primary and follow-up valve members defining a neutral rotary position, a rotary operating position in which said primary valve member is rotatably displaced from said neutral rotary position, relative to said follow-up valve member, and said follow-up valve member defining a first axial position; said controller further defining a controller inlet, a first variable flow control orifice in fluid communication with said controller inlet, a second variable flow control orifice in fluid communication with said first control fluid port, and a main fluid path providing fluid communication between said first and second variable flow control orifices when said valve members are in said first rotary operating position; said load sensing priority flow control valve means including means defining a priority flow control orifice operable to control the flow of fluid from the source to said controller valve means, and an auxiliary flow control orifice operable to control the flow of fluid from the source to the auxiliary device, in response to the demand for fluid by the priority fluid pressure operated device; characterized by:
(a) said follow-up valve member defining a second axial position;
(b) said controller valve means including means operable to bias said follow-up valve member toward said first axial position, and means operable to bias said follow-up valve member toward said second axial position; and
(c) said follow-up valve member and said housing means cooperating to define said priority flow control orifice when said follow-up valve member is in said first axial position, and to define said auxiliary flow control orifice when said follow-up valve member is in said second axial position.

17. A system as claimed in claim 16, characterized by said housing means defining a pressure fluid chamber in continuous fluid communication with the source of pressurized fluid, and said follow-up valve member defining a first fluid port disposed to be in continuous fluid communication with said pressure fluid chamber when said follow-up valve member is in said first axial position, said first fluid port comprising said controller inlet.

18. A system as claimed in claim 16, characterized by said primary valve member defining first and second fluid passages; said follow-up valve member defining first and second fluid ports; and said first and second fluid ports being in fluid communication with sad first and second fluid passages, respectively, to define said first and second variable flow control orifices, respectively, when said valve members are in said rotary operating position.

19. A system as claimed in claim 18, characterized by said primary and follow-up valve members cooperating with said housing means to define said main fluid path.

20. A system as claimed in claim 16, characterized by said housing means defining a pressure fluid chamber in continuous fluid communication with the source of pressurized fluid, and an auxiliary fluid chamber in continuous fluid communication with the auxiliary device; and said follow-up valve member defining an axial fluid passage disposed to provide fluid communication from said pressure fluid chamber to said auxiliary fluid chamber when said follow-up valve member is in said second axial position.

21. A system as claimed in claim 20, characterized by said pressure fluid chamber and said controller inlet cooperating to define said priority flow control orifice when said follow-up valve member is in said first axial position, and said axial fluid passage and said auxiliary fluid chamber cooperating to define said auxiliary flow control orifice when said follow-up valve member is in said second axial position.

22. A system as claimed in claim 16, characterized by said follow-up valve member defining a load sensing passage in fluid communication with said main fluid path, downstream of said first variable flow control orifice when said valve members are in said rotary operating position.

23. A system as claimed in claim 22, characterized by said follow-up valve member and said housing means cooperating to define a load signal chamber in continuous fluid communication with said load sensing passage, said means operable to bias said follow-up valve member toward said first axial position including the fluid pressure in said load signal chamber.

24. A system as claimed in claim 16, characterized by said follow-up valve member and said housing means cooperating to define a pilot pressure chamber in continuous fluid communication with a pressure fluid chamber when said follow-up valve member is in said first axial position, said means operable to bias said follow-up valve member toward said second axial position comprising the fluid pressure in said pilot pressure chamber.

25. A system as claimed in claim 24, characterized by said primary valve member defining an axially-extending passage on the exterior surface thereof, disposed to provide continuous fluid communication between a pilot port, defined by said follow-up valve member and said pilot pressure chamber, said pilot port being disposed in continuous fluid communication with said pressure fluid chamber when said follow-up valve member is in said first axial position.

26. A system including a source of pressurized fluid, a priority fluid pressure operated device, an auxiliary fluid pressure operated device, a controller, a controller valve means operable to control the flow of fluid to the priority fluid pressure operated device, and load sensing priority flow control valve means operable to control the flow of fluid from the source of fluid to said controller valve means and to the auxiliary fluid pressure operated device; said controller including housing means defining first and second control fluid ports for connection to the priority fluid pressure operated device, and valve means disposed in said housing means and comprising a generally cylindrical spool valve member and a hollow, generally cylindrical sleeve valve member disposed radially between said housing means and said spool valve member, said spool and sleeve valve members defining a neutral position relative to each other, and an operating position relative to each other; said housing means and said sleeve valve member defining a first position relative to each other; said controller further defining a controller inlet, a said valve means defining a first variable flow control orifice in fluid communication with said controller inlet, and a second variable flow control orifice in fluid communication with said first control fluid port, said first and second variable flow control orifices being defined at the interface of said spool and sleeve valve members when said valve members are in said operating position, said housing means and said valve members cooperating to define a main fluid path providing fluid communication between said first and second variable flow control orifices when said valve members are in said operating position; said load sensing priority flow control valve means including means defining a priority flow control orifice operable to control the flow of fluid from the source to said controller valve means, and an auxiliary flow control orifice operable to control the flow of fluid from the source to the auxiliary device, in response to the demand for fluid by the priority device; characterized by:

(a) said sleeve valve member and said housing means defining a second position relative to each other;

(b) said controller including means operable to bias said sleeve valve member toward said first position, relative to said housing means, and means operable to bias said sleeve valve member toward said second position, relative to said housing means;

(c) said sleeve valve member and said housing means cooperating to define said priority flow control orifice when said sleeve valve member is in said first position relative to said housing means; and, (d) said sleeve valve member and said housing means cooperating to define said auxiliary flow control orifice when said sleeve valve member is in said second position relative to said housing means.

27. A system as claimed in claim 26, characterized by said controller including spring means operable to bias said spool and sleeve valve members toward said neutral position relative to each other.

28. A system as claimed in claim 27, characterized by input means operably associated with one of said spool and sleeve valve members to displace said spool and sleeve valve members from said neutral position to said operating position.

29. A system as claimed in claim 28, characterized by said displacement of said spool and sleeve valve members from said neutral position to said operating position occurring in response to relative rotation between said spool and sleeve valve members.

30. A system as claimed in claim 26, characterized by said means operable to bias said sleeve valve member toward said first position, relative to said housing means, comprises said housing means and said sleeve valve member cooperating to define a load signal chamber in continuous fluid communication with said main fluid path, downstream of said first variable flow control orifice.

31. A system as claimed in claim 30, characterized by said means operable to bias said sleeve valve member toward said second position, relative to said housing means, comprises said housing means and said sleeve valve member cooperating to define a pilot pressure chamber in continuous fluid communication with said main fluid path, upstream of said first variable flow control orifice.

32. A system as claimed in claim 31, characterized by displacement of said sleeve valve member, relative to said housing means, between said first position and said second position, occurring in response to relative axial movement between said sleeve valve member and said housing means.

33. A system as claimed in claim 31, characterized by said spool valve member defining an axially-extending passage on the exterior surface thereof, disposed to provide continuous fluid communication between said controller inlet and said pilot pressure chamber.

34. A system as claimed in claim 30, characterized by said spool valve member defining an axially-extending passage on the exterior surface thereof, disposed to provide continuous fluid communication between said main fluid path, downstream of said first variable flow control orifice, and said load signal chamber.

* * * * *